United States Patent
Tillet et al.

(10) Patent No.: US 7,974,224 B2
(45) Date of Patent: *Jul. 5, 2011

(54) SUBSCRIBER UNIT CAPABLE OF SWITCHING BETWEEN FULL-DUPLEX AND HALF-DUPLEX MODES DURING AN ON-GOING SESSION

(75) Inventors: Daniel Tillet, Oak Hill, VA (US); Karalyn M. Szuszczewicz, Haymarket, VA (US); Ojas T. Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1981 days.

This patent is subject to a terminal disclaimer.

(21) Appl. No.: 10/903,092

(22) Filed: Jul. 31, 2004

(65) Prior Publication Data

US 2006/0023649 A1 Feb. 2, 2006

(51) Int. Cl.
*H04L 5/16* (2006.01)
*H01Q 11/12* (2006.01)
*H04B 1/04* (2006.01)

(52) U.S. Cl. .................................... 370/296; 455/127.4
(58) Field of Classification Search .................. None
See application file for complete search history.

(56) References Cited

U.S. PATENT DOCUMENTS

| | | | |
|---|---|---|---|
| 4,870,408 A | 9/1989 | Zdunek et al. |
| 5,442,809 A | 8/1995 | Diaz et al. |
| 5,506,837 A | 4/1996 | Soellner et al. |
| 5,568,511 A | 10/1996 | Lampe |
| 5,710,591 A | 1/1998 | Bruno et al. |
| 5,818,836 A | 10/1998 | DuVal |
| 5,825,755 A | 10/1998 | Thompson et al. |
| 5,850,611 A | 12/1998 | Krebs |
| 5,884,196 A | 3/1999 | Lekven et al. |
| 5,936,964 A | 8/1999 | Valko et al. |
| 5,983,099 A | 11/1999 | Yao et al. |
| 6,014,556 A | 1/2000 | Bhatia et al. |
| 6,032,051 A | 2/2000 | Hall et al. |
| 6,041,241 A | 3/2000 | Willey |
| 6,119,017 A | 9/2000 | Cassidy et al. |
| 6,178,323 B1 | 1/2001 | Nagata |
| 6,256,487 B1 | 7/2001 | Bruhn |

(Continued)

FOREIGN PATENT DOCUMENTS

EP 0 817 457 1/1998

(Continued)

OTHER PUBLICATIONS

International Search Report dated Jun. 22, 2006 (Five (5) pages).

(Continued)

*Primary Examiner* — Ayaz R Sheikh
*Assistant Examiner* — Sori A Aga

(57) ABSTRACT

A subscriber unit including an interface and a processor to transmit a first request to a wireless communication system by way of the interface to request a communication session in a first communication mode with one or more users; communicate with the one or more users by way of the interface in the communication session and in the first communication mode; transmit, while in the communication session, a second request to the wireless communication system by way of the interface to switch the first communication mode to a different second communication mode; and communicate with the one or more users by way of the interface in the communication session and in the second communication mode.

42 Claims, 12 Drawing Sheets

U.S. PATENT DOCUMENTS

| | | | |
|---|---|---|---|
| 6,366,567 B1 | 4/2002 | Singh et al. | |
| 6,381,467 B1 | 4/2002 | Hill et al. | |
| 6,452,941 B1 | 9/2002 | Bruhn | |
| 6,490,452 B1 | 12/2002 | Boscovic et al. | |
| 6,526,377 B1 | 2/2003 | Bubb | |
| 6,580,697 B1 | 6/2003 | Gardner et al. | |
| 6,600,727 B1 | 7/2003 | Mackay | |
| 6,665,275 B1 | 12/2003 | Davy et al. | |
| 7,453,837 B2* | 11/2008 | Jiang et al. | 370/320 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2004/0009761 A1* | 1/2004 | Money et al. | 455/406 |
| 2004/0127233 A1* | 7/2004 | Harris et al. | 455/458 |
| 2004/0127251 A1* | 7/2004 | Thakkar et al. | 455/552.1 |
| 2004/0166832 A1* | 8/2004 | Portman et al. | 455/412.1 |
| 2005/0144485 A1* | 6/2005 | Mousseau | 713/202 |
| 2005/0213518 A1* | 9/2005 | Ahya et al. | 370/276 |

FOREIGN PATENT DOCUMENTS

| | | |
|---|---|---|
| EP | 0 984 608 | 3/2000 |

OTHER PUBLICATIONS

Written Opinion of the International Searching Authority (Seven (7) pages).
U.S. Appl. No. 10/903,302, filed Jul. 31, 2004, Tillet.
U.S. Appl. No. 11/485,216, filed Jul. 12, 2006, Choksi.
U.S. Appl. No. 11/485,087, filed Jul. 12, 2006, Choksi.
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
3$^{rd}$ Generation Partnership Project 2 "3GPP2", "Fast Call Set-Up," Version 1.0, Apr. 15, 2002.
Mobile Tornado, http://www.mobiletornado.com/products_iprscott.html, printed from the World Wide Web on Jan. 27, 2003.
"Qualcomm Chats Up 'Push-to-Tallk'", http://siliconvalley.internet.com/news/print.php/953261, printed from the World Wide Web on Jan. 27, 2003.
Schulzrinne and Rosenberg, SIP Caller Preferences and Callee Capabilities, Internet Engineering Task Force, Internet Draft, Oct. 22, 1999.
Vakil et al., "Host Mobility Protocol Extending SIP to 3G-IP Networks," Internet Engineering Task Force, Internet Draft, Oct. 1999.
Campbell and Sparks, "Control of Service Context Using SIP Request—URI", Networking Working Group, Apr. 2001.
Ericsson, www.telecomcorridor,com/wireless%20horizons/1Coyne.pdf, printed from the World Wide Web on Jun. 27, 2001.
Dirk Kutscher/Jorg Ott, "The Message Bus—A Communication and Integration Infrastructure for Component-Based Systems," White Paper, Jan. 2000.
Ott etal., "A Message Bus for Local Coordination," Network Working Group, Internet-Draft, May 30, 2001.
TR45, Medium Access Control (MAC) Standard for cdma2000 Spread Spectrum System, IS-2000-3, Jul. 12, 1999.
3$^{rd}$ Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley, et al., "SDP: Session Description Protocol," Internet Engineering Task Force Request for Comment 2327, Apr. 1998.
Handley, et al., "SIP: Session Initiation Protocol," Internet Engineering Task Force Request for Comment 2543, Mar. 1999.
Fielding et al., "Hypertext Transfer Protocol—HTTP/1.1," Internet Engineering Task Force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
Oma, Discussion and definitions on PoC Floor Control, Input Contribution, Doc #OMA-REQ-2003-0375-PoC_Floor_Control, Jun. 2, 2003.
Oma, "PoC Use case: Mobile—PC Example," Input Contribution, Doc #OMA-REQ-2003-0323 PoC Mobile-PC use case, May 5, 2003.
Oma, "PoC Use case: Multimedia Group Call Example," Input Contribution, Doc #OMA-REQ-2003-0306-PoC Use Case-group-multi-media-scenario, May 6, 2003.
Oma, "PoC Use case: Examples of User Requirements,"Input Contribution, Doc #OMA-REQ-2003-0305-Poc Use Case, May 6, 2003.
Oma, "Inputs for PoC Requirements Document," Input Contribution, Doc #OMA-REQ-2003-0367-PoC_Input_Motorola, May 29, 2003.
Oma, "Push to Walk over Cellular (PoC)," Version 0.1.6, May 12, 2003.
Notice of Allowance received in U.S. Appl. No. 10/903,302, dated Oct. 9, 2007.
Reply filed in U.S. Appl. No. 10/903,302 dated Sep. 24, 2007.

* cited by examiner

SUBSCRIBER UNIT CAPABLE OF SWITCHING BETWEEN FULL-DUPLEX AND HALF-DUPLEX MODES DURING AN ON-GOING SESSION

FIELD OF THE INVENTION

This invention relates generally to wireless communication systems, and in particular, to a wireless communication system capable of providing seamless switching between full-duplex and half-duplex modes.

BACKGROUND OF THE INVENTION

Wireless communication systems have become increasingly popular over the last decade. Such systems allow users to communicate with each other in various modes. For example, some systems allow users to communicate with each other by way of a full-duplex voice communication link where the link is allocated to all parties for transmitting and receiving voice communication (e.g. a cellular communication). Other systems allow users to communicate with each other by way of a half-duplex voice communication link where the link is allocated to a single party at a time for transmitting voice communication (e.g. a dispatch communication).

In many situations, a user initiates a communication with one or more users in a particular mode, for example, half-duplex mode or full-duplex mode, but after the communication commences, it becomes apparent to the users that the current mode of communication is not the most desirable. For example, a calling party initiates a half-duplex call with a target party for the purpose of asking the target party some very short questions. Such call consisting of short questions is typically suitable for half-duplex communication. After several conversations going back and forth in a half-duplex fashion, the parties realize that it would be more desirable to communicate in a full-duplex mode. In such situation and using prior art wireless communication systems, the parties need to terminate the half-duplex call and start a new full-duplex call.

Accordingly, there is a need for a wireless communication system and method that allow for seamless switching between full-duplex and half-duplex modes. This would eliminate the need to terminate the initial call in a particular mode and start a second call in another mode. More generally, there is a need for a wireless communication system and method that allow for seamless switching between two or more different communication modes. Such needs and other are disclosed herein in accordance with the various embodiments of the invention.

SUMMARY OF THE INVENTION

An aspect of the invention relates to a wireless communication system comprising a call controller to establish a communication session in a first communication mode between two or more users; receive a request from at least one of the users to switch the first communication mode of the communication session to a second communication mode; and switch the first communication mode of the communication session to the second communication mode. The first and second communication mode may respectively comprise half-duplex and full-duplex modes, or vice-versa. A method related to the operation of the wireless communication system is also disclosed.

Another aspect of the invention relates to a call controller comprising a network interface and a processor to establish a communication session in a first communication mode between two or more users; receive a request from at least one of the users by way of the network interface to switch the first communication mode of the communication session to a second communication mode; and switch the first communication mode of the communication session to the second communication mode. A method and computer readable medium containing software related to the operations of the call controller are also disclosed.

Yet, another aspect of the invention relates to a call controller, comprising a network interface, and a processor to receive a first request by way of the network interface for a first communication session between a first set of users, wherein the first request specifies a first communication mode for the first communication session; establish the first communication session in the first communication mode between the first set of users; receive a second request by way of the network interface for a second communication session between a second set of users, wherein the second request specifies a second communication mode for the second communication session; and establish the second communication session in the second communication mode between the second set of users, wherein the first communication mode is different than the second communication mode. A method and computer readable medium containing software related to the operations of the call controller are also disclosed.

Still, another aspect of the invention relates to a subscriber unit comprising an interface and a processor to transmit a first request to a wireless communication system by way of the interface to request a communication session in a first communication mode with one or more users; communicate with the one or more users by way of the interface in the communication session and in the first communication mode; transmit, while in the communication session, a second request to the wireless communication system by way of the interface to switch the first communication mode to a different second communication mode; and communicate with the one or more users by way of the interface in the communication session and in the second communication mode. A method and computer readable medium containing software related to the operations of the call controller are also disclosed.

Even still another aspect of the invention relates to a subscriber unit comprising an interface, and a processor to receive a first request from a wireless communication system by way of the interface requesting a communication session in a first communication mode with one or more users; transmit a first response to the first request to the wireless communication system by way of the interface, wherein the first response indicates an acceptance of the first request; communicate with the one or more users in the communication session and in the first communication mode; while in the communication session, receive a second request from the wireless communication system by way of the interface to switch the first communication mode to a different second communication mode; transmit a second response to the second request to the wireless communication system by way of the interface, wherein the second response indicates an acceptance of the second request; and communicate with the one or more users in the communication session and in the second communication mode. A method and computer readable medium containing software related to the operations of the call controller are also disclosed.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
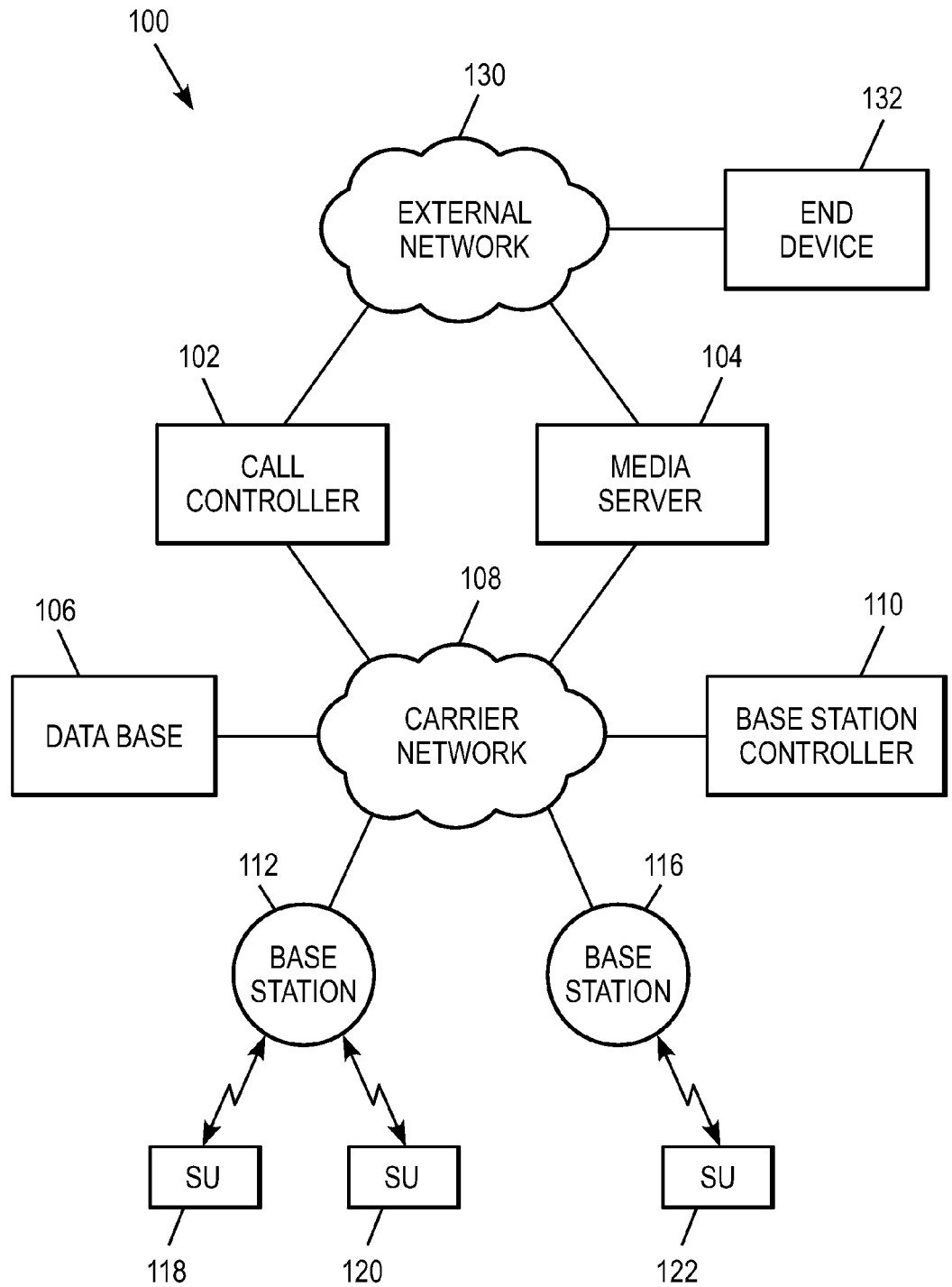
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. The wireless communication system 100 comprises a call controller 102, a media server 104, a database 106, a carrier network 108, a base station controller 110, and a plurality of base stations, two of which are shown as base stations 112 and 116. The wireless communication system 100 serves a plurality of subscriber units (SUs), three of which are shown as SUs 118, 120, and 122. The call controller 102 and media server 104 may be coupled to an external network 130 to allow an end device 132, such as a desktop computer, to receive communication services from the wireless communication system 100 as would an SU.

The call controller 102 performs the various operations to setup calls in different communication modes, as well as seamlessly switch ongoing calls between the different communication modes. For example, the call controller 102 sets up half-duplex calls between two or more users, sets up full-duplex calls between two or more users, switches an ongoing call from half-duplex mode to full-duplex mode, and switches an ongoing call from full-duplex mode to half-duplex mode. Users are generally defined as entities that communicate with the wireless communication system 100, including SUs 118, 120, and 122, as well as end devices coupled to the external network 130, such as end device 132.

The media server 104 processes voice packets so that they are properly delivered to the intended destination. For example, the media server 104 receives voice packets intended for one or more target users, forms duplicate voice packets so that they could be transmitted to the one or more target users, and modifies the voice packets so they can be routed to the one or more target users. Additionally, the media server 104 works in conjunction with the base station controller 110 and base stations to negotiate a suitable bandwidth for the current communication mode. For example, if the communication mode is half-duplex, the media server 104 may negotiate a bandwidth of 10 kbits/sec. If the communication mode is full-duplex, the media server may negotiate a bandwidth of 16 kbits/sec.

The database 106 stores and provides provisioning information concerning services available to users. For instance, if the call controller 102 receives a request for a half-duplex or full-duplex call from an SU, the call controller 102 may send a query to the database 106 to determine whether the requesting and target SUs are eligible to receive half-duplex or full-duplex communication services. Similarly, if the call controller 102 receives a request to switch an ongoing session between half-duplex mode and a full-duplex mode, the call controller 102 sends a query to the database 106 to determine whether the requesting and target SUs are eligible to receive the requested switching service.

The base station controller 110 controls the radio frequency (RF) resources of the base stations 112 and 116. For example, the base station controller 110 may set the frequencies for the radios present in the base stations. The base station controller 110 may also set the channel and bandwidth in the base stations to communicate with the users in the current communication mode. For instance, if the current communication mode is half-duplex, the base station controller 110 may set the RF bandwidth used by the base station to communicate with the SUs to, for example, 10 kbits/sec. If the current communication mode is full-duplex, the base station controller 110 may set the RF bandwidth used by the base stations to communicate with the SUs to, for example, 16 kbits/sec. A change in the bandwidth may translate into an allocation or deallocation of some RF resources, such as time slots, carriers, Walsh codes, etc.

The base stations 112 and 116 provide the wireless (RF) interface between the carrier network 108 and the SUs 118, 120, and 122. More specifically, under the control of the base station controller 110, the base stations transmit pages, messages, data and voice information to the SUs using a predetermined RF channel and bandwidth. Similarly, the base stations receive page responses, messages, data, and voice information from the SUs using a predetermined RF channel and bandwidth. The base stations also control RF power levels and handoffs of SUs to other base stations. The base stations communicate with the SUs in any of a number of suitable RF protocols, including, without limitation, code division multiple access (CDMA), Wideband code division multiple access (WCMDA), time division multiple access (TDMA), frequency division multiplexing (FDM), orthogonal frequency division multiplexing (OFDM), time division duplex (TDD), frequency division duplex (FDD), time division synchronous CDMA (TDSCDMA), 802.11x, 802.16 or any combination thereof.

The carrier network 108 communicatively couples together the various elements of the wireless communication system 100, such as the call controller 102, media server 104, database 106, base station controller 110, and base stations 112 and 116. The carrier network 108 may be of any suitable type, including, without limitation, frame relay, asynchronous transfer mode (ATM), multiple protocol label switching (MPLS), and/or internet protocol (IP).

As discussed above, the wireless communication system 100 may be coupled to an external network 130 to provide communication services to the end device 132, such as a desktop computer, a laptop, a handheld device, etc. In this example, the call controller 102 is coupled to the external network 130 to provide and receive control signals to setup half-duplex and full-duplex sessions, and to seamlessly switch ongoing sessions between half-duplex and full-duplex communication modes. The media server 104 is coupled to the external network 130 to provide voice packet processing for the end device 132. The external network 130 may be the Internet, a wide area network (WAN), an intranet, a local area network (LAN), a wireless LAN (WLAN), or other suitable network.

As the various elements of the wireless communication system 100 have been discussed, the following provides a discussion of an exemplary method of seamlessly switching an ongoing session from a half-duplex mode to a full-duplex mode, an exemplary method of setting up a half-duplex mode, an exemplary method of seamlessly switching an ongoing session from a full-duplex mode to a half-duplex mode, an exemplary method of setting up a full-duplex session, an exemplary method of seamlessly switching an ongoing communication session from a first communication mode to a second communication mode, and another exemplary method of seamlessly switching an ongoing communication session from a first communication mode to a second communication mode.

Figure 2:
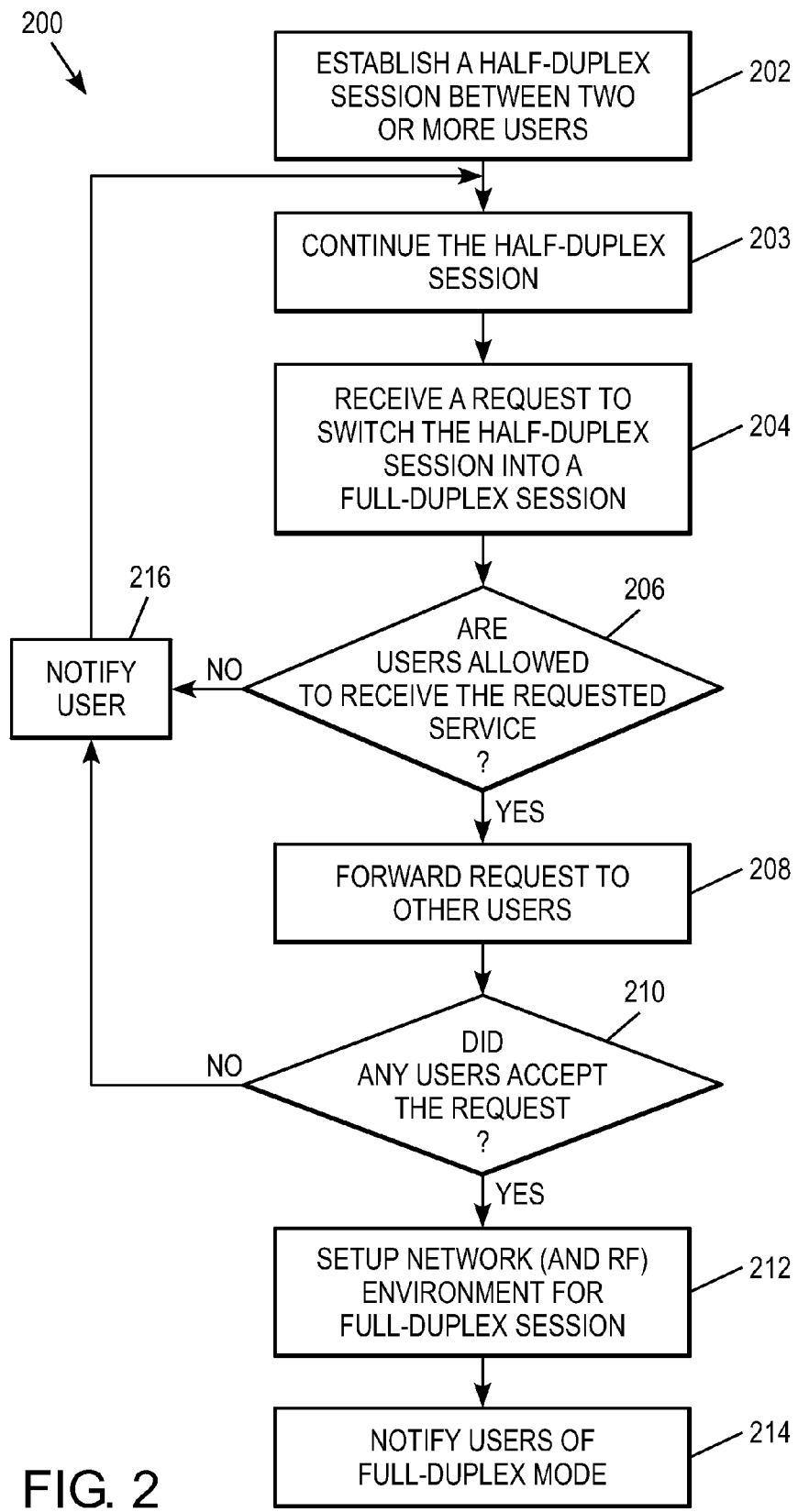
FIG. 2 illustrates a flow diagram of an exemplary method of seamlessly switching an ongoing communication session from a half-duplex mode to a full-duplex mode in accordance with an embodiment of the invention.

FIG. 2 illustrates a flow diagram of an exemplary method 200 of seamlessly switching an ongoing communication session from half-duplex mode to full-duplex in accordance with an embodiment of the invention. According to the method 200, the wireless communication system 100 first establishes a half-duplex session between two or more users (block 202). There are many ways that the wireless communication system 100 can establish a half-duplex session. One example of establishing a half-duplex session is discussed later in connection with FIG. 3.

After the wireless communication system 100 establishes a half-duplex session between two or more users, the wireless communication system 100 continues the ongoing half-duplex session (block 203). During the ongoing half-duplex session, the wireless communication system 100 receives a request from one of the users to switch the half-duplex session into a full-duplex session (block 204). If, for example, the user requesting the switch is operating SU 118, the request is received by the call controller 102 by way of the base station 112 and carrier network 108. If, on the other hand, the user requesting the switch is operating the end device 132, the request is received by the call controller 102 by way of the external network 130.

After the wireless communication system 100 receives the request to switch the half-duplex session into a full-duplex session, the system 100 determines whether the users are eligible to receive the switching service (block 206). To this endeavor, the call controller 102 may access its internal cache memory for information relevant to whether one or more of the users are eligible for this service. Otherwise, or in addition to, the call controller 102 sends a query to the database 106 by way of the carrier network 108 requesting information as to whether one or more of the users are eligible for this service. The database 106, in turn, sends a response to the query to the call controller 102 by way of the carrier network 108.

If the call controller 102 determines that the users are not eligible for the switching service, the call controller 102 sends a message to the requesting user notifying the user that the switching request is not available (block 216). If such is the case, the half-duplex session continues between the users (block 203). If, on the other hand, the call controller 102 determines that the users are available to receive the switching service, the call controller 102 then forwards the switching request to the other users participating in the half-duplex session (block 208). In the case that one of the parties is operating SU 122, for example, the call controller 102 forwards the switching request to SU 122 by way of the carrier network 108 and base station 116. In the case that one of the parties is operating the end device 132, the call controller 102 forwards the switching request to the end device 132 by way of the external network 130.

The call controller 102 then waits a predetermined time interval to receive an acceptance to the switching request from any of the users (block 210). If the call controller 102 does not receive an acceptance to the switching request within the predetermined time interval, the half-duplex session continues between the users (block 203). If, on the other hand, at least one of the users sends an acceptance message to the call controller 102 within the predetermined time interval, the method 200 proceeds to block 212. The number of users required to accept and the predetermined time interval for the method 300 to proceed to block 212 may be configurable. In the case the party accepting the switching request is operating SU 122, the acceptance message is received by the call controller 102 by way of the base station 112 and carrier network 108. In the case the party accepting the switching request is operating the end device 132, the acceptance message is received by the call controller 102 by way of the external network 130.

After the call controller 102 receives the acceptance message from at least one of the parties to the half-duplex session, the call controller 102 sets up the network (and RF) environment for the full-duplex session (block 212). For example, the call controller 102 may enable full-duplex session features, such as call waiting. The call controller 102 may also configure the media server 104 to allocate a bi-directional path, appropriate bandwidth for full-duplex, appropriate quality of service (QoS) for full-duplex, enable echo cancellation and voice mixing, and set the appropriate jitter buffers for full-duplex. The call controller 102 may also directly or indirectly cause the base station controller 110 and base stations 112 and 116 to negotiate appropriate RF resources to handle the full-duplex session, such as bandwidth, carrier, time slot, Walsh code, etc. It shall be understood that the RF environment need not be set up if the session is only between two or more end devices 132.

After the call controller 102 sets up the appropriate network environment for the full-duplex session, the call controller 102 sends respective messages to the parties that full-duplex is in session (block 214). Again, if two of the parties are operating SUs 118 and 122, the call controller 102 sends the messages by way of the carrier network 108 and the respective base stations 112 and 116. If one of the parties is operating end device 132, the call controller 102 sends the message to the end device 132 by way of the external network 130. Thus, this completes the seamless switching of the ongoing session from half-duplex to full-duplex.

Figure 3:
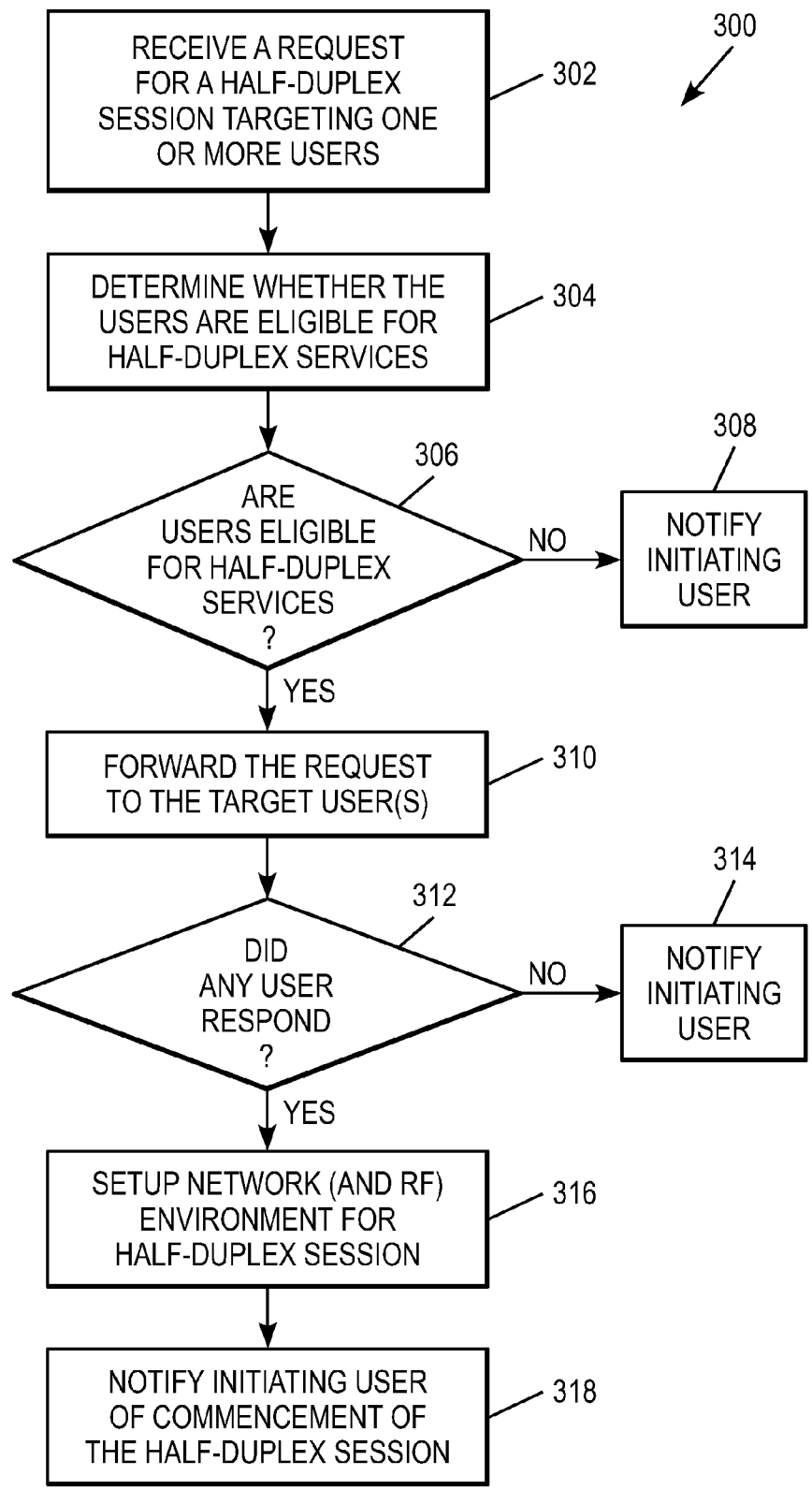
FIG. 3 illustrates a flow diagram of an exemplary method of establishing a half-duplex session in accordance with another embodiment of the invention.

FIG. 3 illustrates a flow diagram of an exemplary method 300 of establishing a half-duplex session in accordance with another embodiment of the invention. According to the method 300, the call controller 102 receives a request from a user for a half-duplex session targeting one or more users (block 302). If, for example, the initiating user is operating SU 118, the call controller 102 receives the request by way of the base station 112 and carrier network 108. If, on the other hand, the initiating user is operating end device 132, the call controller 102 receives the request by way of the external network 130.

Once the call controller 102 receives the half-duplex session request, the call controller 102 determines whether the requesting user and the one or more target users are eligible to receive the half-duplex session service (block 304). This may entail the call controller 102 accessing its internal cache memory for information relevant to whether the one or more users are eligible for this service. Otherwise, or in addition to, the call controller 102 may send a query to the database 106 by way of the carrier network 108 requesting whether one or more of the users are eligible for this service. The database 106, in turn, sends a response to the query to the call controller 102 by way of the carrier network 108.

If the call controller 102 determines that that the users are not eligible to receive the half-duplex session service (block 306), the call controller 102 sends a notification to the initiating user (block 308). If, for example, the initiating user is operating SU 118, the call controller 102 sends the message to SU 118 by way of the carrier network 108 and base station 112. If, on the other hand, the initiating user is operating end device 132, the call controller 102 sends the message to end device 132 by way of the external network 130.

If, on the other hand, the call controller 102 determines that the users are eligible to receive the half-duplex session service (block 306), the call controller 102 forwards the half-duplex session request to the one or more target users (block 310). If, for example, two of the target parties are operating SUs 120 and 122, the call controller 102 forwards the requests to them by way of the carrier network 108 and the respective base stations 112 and 116. If one of the target parties is operating end device 132, the call controller 102 forwards the request to it by way of the external network 130.

The call controller 102 then waits a predetermined time interval to receive an acceptance to the half-duplex session request from any of the target users (block 312). If the call controller 102 does not receive an acceptance to the request within the predetermined time interval, the call controller 102 notifies the initiating user (block 314). If, on the other hand, at least one of the users sends an acceptance message to the call controller 102 within the predetermined time interval, the method 300 proceeds to block 316. In the case the party accepting the request is operating SU 122, the acceptance message is received by the call controller 102 by way of the base station 116 and carrier network 108. In the case the party accepting the request is operating the end device 132, the acceptance message is received by the call controller 102 by way of the external network 130.

After the call controller 102 receives the acceptance message from at least one of the target parties, the call controller 102 sets up the network (and RF) environment for the half-duplex session (block 316). For example, the call controller 102 may enable half-duplex session features, such as call alert. The call controller 102 may also configure the media server 104 to allocate uni-directional path, appropriate bandwidth for half-duplex, appropriate quality of service (QoS) for half-duplex, disable echo cancellation and voice mixing, and set the appropriate jitter buffers for half-duplex. The call controller 102 may also directly or indirectly cause the base station controller 110 and base stations 112 and 116 to setup appropriate RF resources to handle the half-duplex session, such as bandwidth, carrier, time slot, Walsh code, etc. It shall be understood that the RF environment need not be set up if the session is only between two or more end devices 132.

After the call controller 102 sets up the appropriate network environment for the half-duplex session, the call controller 102 sends a message to the initiating party that half-duplex is in session (block 318). Again, if the initiating user is operating SU 118, the call controller 102 sends the message by way of the carrier network 108 and base station 112. If the initiating user is operating end device 132, the call controller 102 sends the message to the end device 132 by way of the external network 130. Thus, this completes the setup of the half-duplex session.

Figure 4:
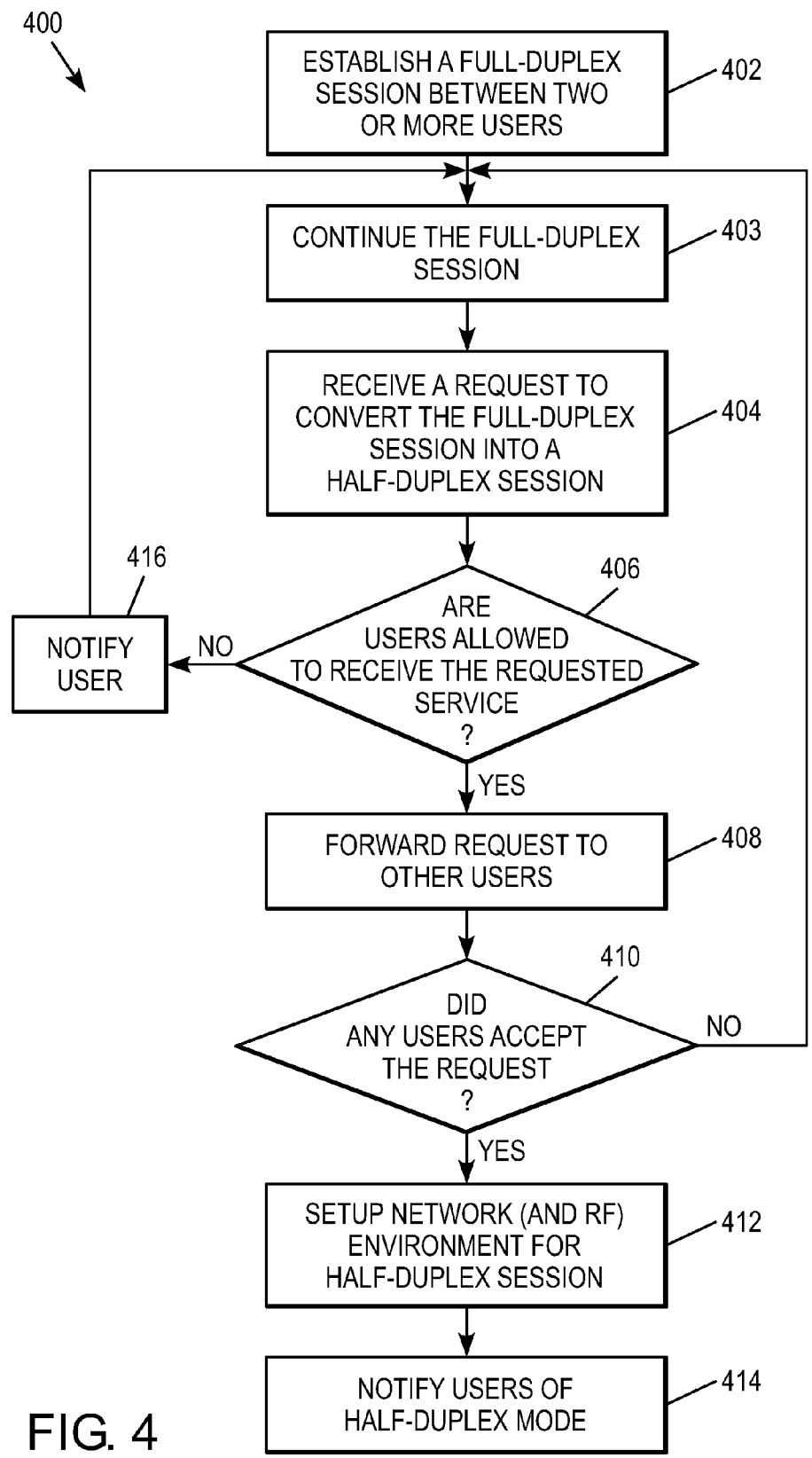
FIG. 4 illustrates a flow diagram of an exemplary method of seamlessly switching an ongoing communication session from a full-duplex mode to a half-duplex mode in accordance with an embodiment of the invention.

FIG. 4 illustrates a flow diagram of an exemplary method 400 of seamlessly switching an ongoing communication session from full-duplex mode to half-duplex mode in accordance with an embodiment of the invention. According to the method 400, the wireless communication system 100 establishes a full-duplex session between two or more users (block 402). There are many ways that the wireless communication system 100 can establish a full-duplex session. One example of establishing a full-duplex session is discussed later in connection with FIG. 5.

After the wireless communication system 100 establishes a full-duplex session between two or more users, the wireless communication system 100 continues the ongoing full-duplex session (block 403). During the ongoing full-duplex session, the wireless communication system 100 receives a request from one of the users to switch the full-duplex session into a half-duplex session (block 404). If, for example, the user requesting the switch is operating SU 118, the request is received by the call controller 102 by way of the base station 112 and carrier network 108. If, on the other hand, the user requesting the switch is operating the end device 132, the request is received by the call controller 102 by way of the external network 130.

After the wireless communication system 100 receives the request to switch the full-duplex session into a half-duplex session, the system 100 determines whether the users are eligible to receive the switching service (block 406). To this endeavor, the call controller 102 may access its internal cache memory for information relevant to whether one or more of the users are eligible for this service. Otherwise, or in addition to, the call controller 102 sends a query to the database 106 by way of the carrier network 108 requesting whether one or more of the users are eligible for this service. The database 106, in turn, sends a response to the query to the call controller 102 by way of the carrier network 108.

If the call controller 102 determines that the users are not eligible for the switching service, the call controller 102 sends a message to the initiating user notifying the user that the switching request is not available (block 416). If such is the case, the full-duplex session continues between the users (block 403). If, on the other hand, the call controller 102 determines that the users are available to receive the switching service, the call controller 102 then forwards the switching request to the other users participating in the full-duplex session (block 408). In the case that one of those parties is operating SU 122, for example, the call controller 102 forwards the switching request to SU 122 by way of the carrier network 108 and base station 116. In the case that one of the parties is operating the end device 132, the call controller 102 forwards the switching request to the end device 132 by way of the external network 130.

The call controller 102 then waits a predetermined time interval to receive an acceptance to the switching request from any of the users (block 410). If the call controller 102 does not receive an acceptance to the switching request within the predetermined time interval, the full-duplex session continues between the users (block 403). If, on the other hand, at least one of the users sends an acceptance message to the call controller 102 within the predetermined time interval, the method 400 proceeds to block 412. The number of users required to accept and the predetermined time interval for the method 300 to proceed to block 212 may be configurable. In the case the party accepting the switching request is operating SU 122, the acceptance message is received by the call controller 102 by way of the base station 116 and carrier network 108. In the case the party accepting the switching request is operating the end device 132, the acceptance message is received by the call controller 102 by way of the external network 130.

After the call controller 102 receives the acceptance message from at least one of the parties to the full-duplex session, the call controller 102 sets up the network (and RF) environment for the half-duplex session (block 412). For example, the call controller 102 may enable half-duplex session features, such as call alert. The call controller 102 may also configure the media server 104 to allocate a uni-directional path, appropriate bandwidth for half-duplex, appropriate quality of service (QoS) for half-duplex, disable echo cancellation and voice mixing, and set the appropriate jitter buffers for half-duplex. The call controller 102 may also directly or indirectly cause the base station controller 110 and base stations 112 and 116 to negotiate an appropriate bandwidth and channel to handle the half-duplex session. It shall be understood that the RF environment need not be set up if the session is only between two or more end devices 132.

After the call controller 102 sets up the appropriate network environment for the full-duplex session, the call controller 102 sends respective messages to the parties that half-duplex is in session (block 414). Again, if two of the parties are operating SUs 118 and 122, the call controller 102 sends the messages by way of the carrier network 108 and the respective base stations 112 and 116. If one of the parties is operating end device 132, the call controller 102 sends the message to the end device 132 by way of the external network 130. Thus, this completes the seamless switching of the ongoing communication session from full-duplex mode to half-duplex mode.

Figure 5:
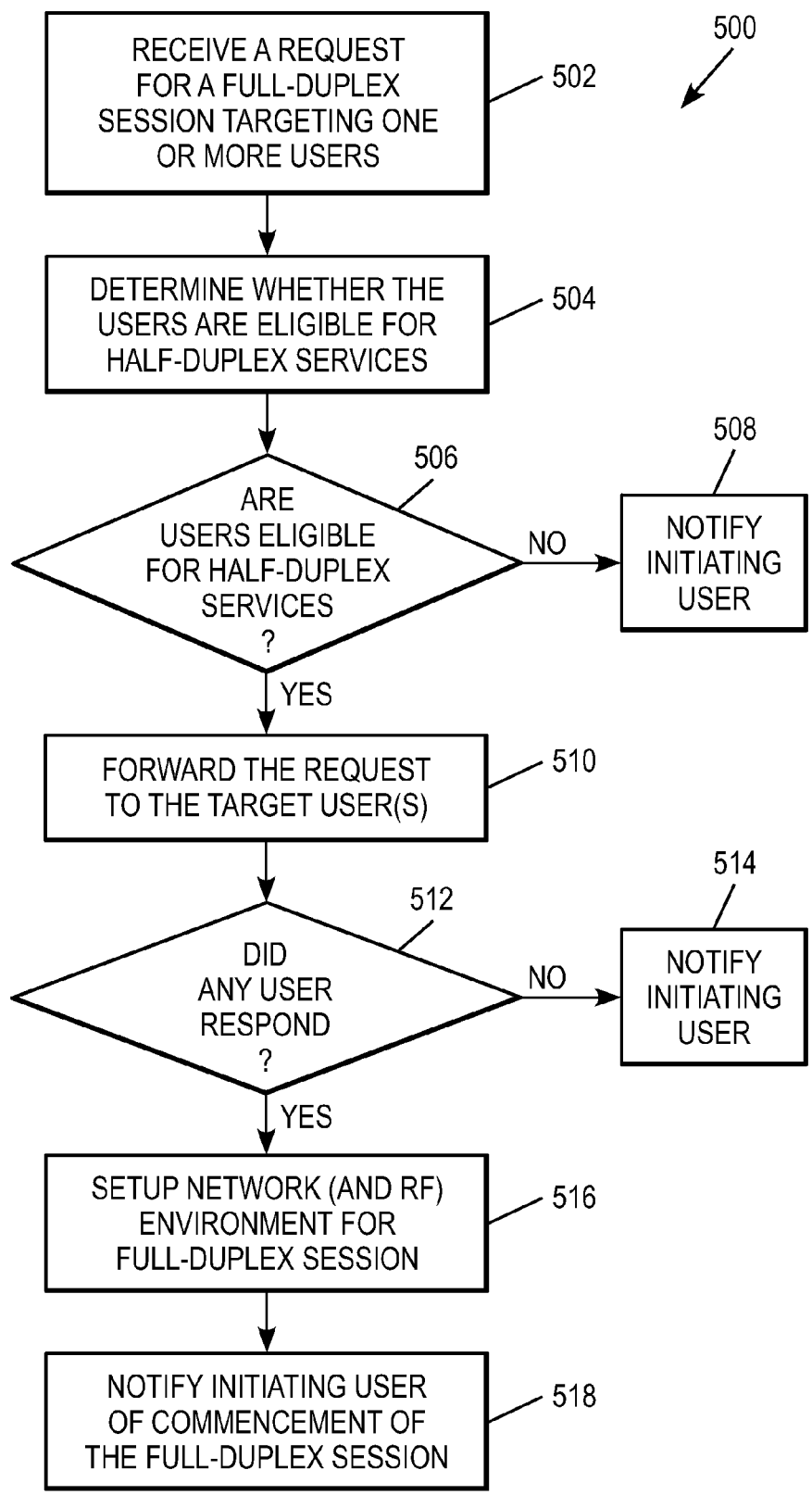
FIG. 5 illustrates a flow diagram of an exemplary method of establishing a full-duplex session in accordance with another embodiment of the invention.

FIG. 5 illustrates a flow diagram of an exemplary method 500 of establishing a full-duplex session in accordance with another embodiment of the invention. According to the method 500, the call controller 102 receives a request from a user for a full-duplex session targeting one or more users (block 502). If, for example, the initiating user is operating SU 118, the call controller 102 receives the request by way of the base station 112 and carrier network 108. If, on the other hand, the initiating user is operating end device 132, the call controller 102 receives the request by way of the external network 130.

Once the call controller 102 receives the full-duplex session request, the call controller 102 determines whether the requesting user and the one or more target users are eligible to receive the full-duplex session service (block 504). This may entail the call controller 102 accessing its internal cache memory for information relevant to whether the one or more users are eligible for this service. Otherwise, or in addition to, the call controller 102 may send a query to the database 106 by way of the carrier network 108 requesting whether one or more of the users are eligible for this service. The database 106, in turn, sends a response to the query to the call controller 102 by way of the carrier network 108.

If the call controller 102 determines that that the users are not eligible to receive the full-duplex session service (block 506), the call controller 102 sends a notification to the initiating user (block 508). If, for example, the initiating user is operating SU 118, the call controller 102 sends the message to SU 118 by way of the carrier network 108 and base station 112. If, on the other hand, the initiating user is operating end device 132, the call controller 102 sends the message to end device 132 by way of the external network 130.

If, on the other hand, the call controller 102 determines that the users are eligible to receive the full-duplex session service (block 506), the call controller 102 forwards the full-duplex session request to the one or more target users (block 510). If, for example, two of the target parties are operating SUs 120 and 122, the call controller 102 forwards the requests to them by way of the carrier network 108 and the respective base stations 112 and 116. If one of the target parties is operating end device 132, the call controller 102 forwards the request to it by way of the external network 130.

The call controller 102 then waits a predetermined time interval to receive an acceptance to the full-duplex session request from any of the target users (block 512). If the call controller 102 does not receive an acceptance to the request within the predetermined time interval, the call controller 102 notifies the initiating user (block 514). If, on the other hand, at least one of the users sends an acceptance message to the call controller 102 within the predetermined time interval, the method 500 proceeds to block 516. In the case the party accepting the switching request is operating SU 122, the acceptance message is received by the call controller 102 by way of the base station 116 and carrier network 108. In the case the party accepting the switching request is operating the end device 132, the acceptance message is received by the call controller 102 by way of the external network 130.

After the call controller 102 receives the acceptance message from at least one of the target parties, the call controller 102 sets up the network (and RF) environment for the full-duplex session (block 516). For example, the call controller 102 may enable full-duplex session features, such as call waiting. The call controller 102 may also configure the media server 104 to allocate bi-directional path, appropriate bandwidth for full-duplex, appropriate quality of service (QoS) for full-duplex, enable echo cancellation and voice mixing, and set the appropriate jitter buffers for full-duplex. The call controller 102 may also directly or indirectly cause the base station controller 110 and base stations 112 and 116 to setup an appropriate bandwidth and channel to handle the full-duplex session. It shall be understood that the RF environment need not be set up if the session is only between two or more end devices 132.

After the call controller 102 sets up the appropriate network environment for the full-duplex session, the call controller 102 sends a message to the initiating user that full-duplex is in session (block 518). Again, if the initiating user is operating SU 118, the call controller 102 sends the message by way of the carrier network 108 and base station 112. If the initiating user is operating end device 132, the call controller 102 sends the message to the end device 132 by way of the external network 130. Thus, this completes the setup of the full-duplex session.

Figure 6:
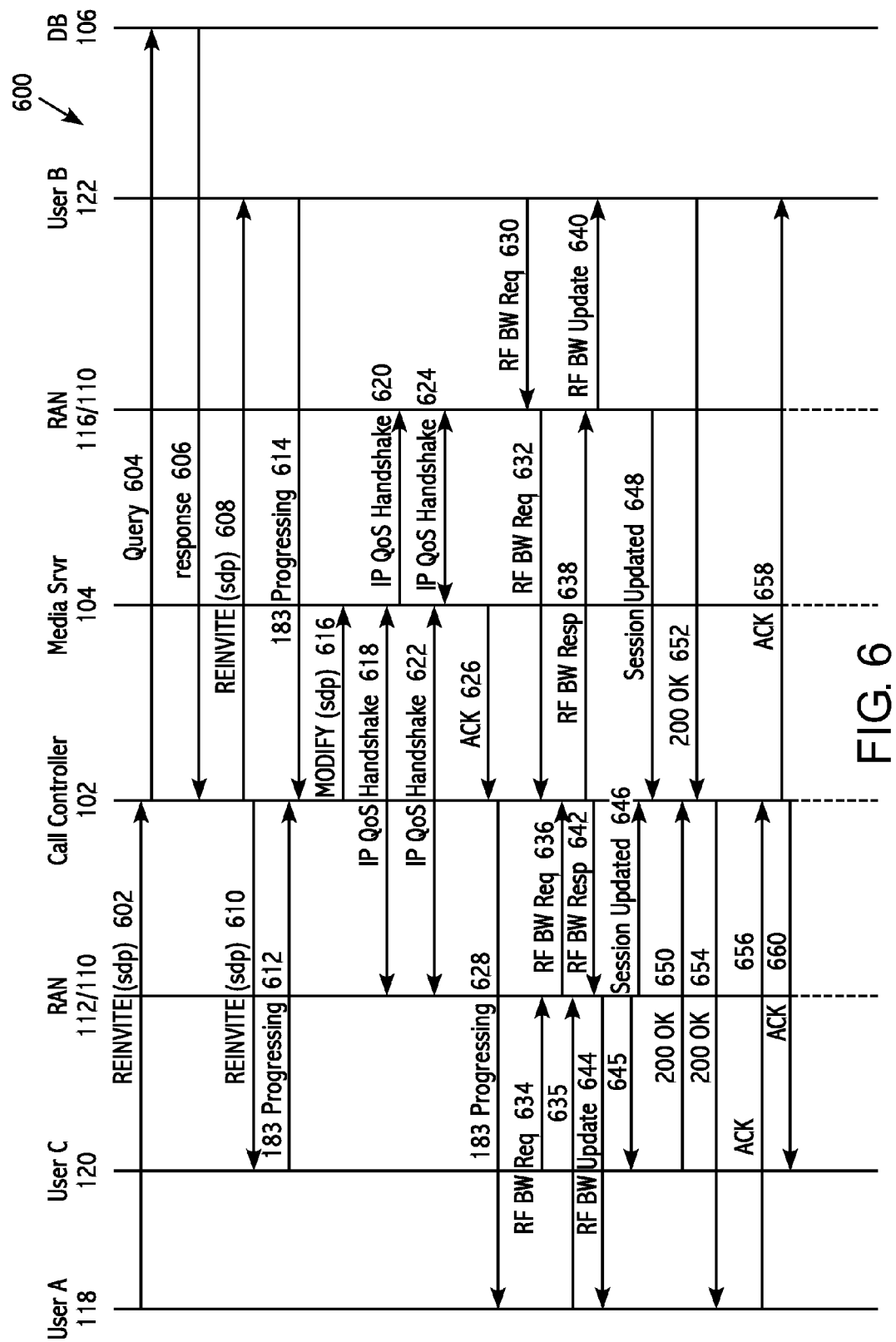
FIG. 6 illustrates a signal flow diagram of an exemplary method of seamlessly switching between communication modes in accordance with an embodiment of the invention.

FIG. 6 illustrates a signal flow diagram of an exemplary method 600 of seamlessly switching an ongoing communication session between different communication modes in accordance with an embodiment of the invention. The method 600 is explained using Session Initiation Protocol (SIP) as the protocol for the control signaling. It shall be understood that other protocols may be used, such as IP based protocols (e.g. QChat Signaling Protocol (QSP)), proprietary protocols (e.g. iDEN), and standard protocols (e.g. Push to Talk over Cellular (PoC)). Further, the interface protocol of the call controller may be standard mechanisms like Media Gateway Control Protocol (MGCP or MEGACO), or proprietary protocols. In addition, the method 600 illustrates a scenario where the SUs drive the negotiation of the new bandwidth pertaining to the new communication mode. As an initial condition for the method 600, users A, B, and C respectively operating SUs 118, 120, and 122 are currently communicating with each other in a communication mode (e.g. half-duplex or full-duplex).

According to the method 600, user A operating SU 118 transmits a REINVITE session description protocol (sdp) message 602 to the call controller 102 by way of the base station 112 and carrier network 108. The sdp parameters embedded in the REINVITE (sdp) message contain session information relevant to the new communication mode, such as parameters relevant to the RF resources and network device and configuration to setup the new mode. The REINVITE (sdp) message 602 request a switch from the current communication mode to a new communication mode (e.g. from half-duplex to full-duplex or from full-duplex to half-duplex).

In response to the REINVITE (sdp) message 602, the call controller 102 determines whether the users A, B, and C are eligible for the switching to the new communication mode. The call controller 102 may have that information cached in a local memory. If it does not, the call controller 102 sends a Query 604 to the database 106 by way of the carrier network 108 to determine whether the initiating user A and target users B and C are eligible to receive the switching request. For example, the wireless communication system 100 may have restrictions placed on users A, B, and/or C which may not allow the switching of the communication mode. In response to the Query 604, the database 106 transmits a response 606 to the call controller 102 by way of the carrier network 108 informing it as to whether the users A, B, and C are eligible to receive the requested service. In this example, the users A, B, and C are eligible to receive the requested service.

Once the call controller 102 has determined that users A, B, and C are eligible to receive the requested service, the call controller 102 sends respective REINVITE (sdp) messages 608 and 610 to the SUs 122 and 120 operated by the respective users B and C by way of the carrier network 108 and respective base stations 112 and 116. The REINVITE (sdp) messages 608 and 610 query the users B and C as to whether they desire to switch communication mode. The users B and C may be required to indicate acceptance by pressing a button on their respective SUs 122 and 120. In this example, the users B and C accept the requested switching of the current communication mode. Accordingly, SUs 122 and 120 send 183 Progressing messages 614 and 612 to the call controller 102 indicating that users B and C have accepted the requested switching of the current communication mode.

Once the call controller 102 is informed of the target users B and C acceptance of the request, the call controller 102 begins to modify the network environment to handle the new communication mode. For instance, if the requested switch is from half-duplex mode to full-duplex mode, the call controller 102 changes the network environment to handle full-duplex mode. Similarly, if the requested switch is from full-duplex mode to half-duplex mode, the call controller 102 changes the network environment to handle half-duplex mode. For example, the call controller 102 may update the call parameters to make available features pertaining to the new communication mode. For instance, if the new communication mode is full-duplex, the call controller 102 makes available features like call waiting. Similarly, if the new communication mode is half-duplex, the call controller 102 makes available features like call alert.

Also, in changing the network environment to handle the new communication mode, the call controller 102 sends a MODIFY (sdp) message 616 to the media server 104 by way of the carrier network 108. In response to the MODIFY (sdp) message 616, the media server 102 changes the parameters for the new communication mode. For instance, if the new communication mode is full-duplex, the media server 104 changes the communication path to bi-directional, enables echo cancellation and voice mixer, updates the jitter buffers for full-duplex communication, and configures the voice codec for full-duplex. Similarly, if the new communication mode is half-duplex, the media server 104 changes the communication path to uni-directional, disables echo cancellation and voice mixer, updates the jitter buffers for half-duplex communication, and configures the voice codec for half-duplex as per the details embedded in the sdp received from each user.

Also, in response to receiving the MODIFY (sdp) message 616, the media server 104 also allocates proper bandwidth and performs quality of service (QoS) negotiations with the corresponding radio access networks RANs 112/110 and 116/110 (being a combination of the controller and base stations). For example, if the new communication mode is full-duplex, the media server 104 allocates a bi-directional bandwidth of, for example, 16 kbits/sec. Similarly, if the new communication mode is half-duplex, the media server 104 allocates a uni-directional bandwidth of, for example, 10 kbits/sec.

In addition, the media server 104 exchange respective IP QoS Handshake messages 618 and 620 with the RANs 112/110 and 116/110 by way of the carrier network 108 to determine whether there is sufficient bandwidth to handle the new communication mode. In response, the corresponding RANs 112/110 and 116/110 exchange respective IP QoS Handshake messages 622 and 624 with the media server 104 by way of the carrier network 108, indicating whether there is sufficient bandwidth to handle the new communication mode. In this example, there is sufficient bandwidth to handle the new communication mode.

Once the media server 104 has reconfigured the network environment to handle the new communication mode, it sends an ACK message 626 to the call controller 102 by way of the carrier network 108 indicating that the network environment has been setup for the new communication mode. In response to the ACK message 626, the call controller 102 sends a 183 Progressing message 628 to the initiating user A by way of the carrier network 108 and base station 112 indicating that the switching request has been accepted.

After the switching request has been accepted, the SUs 118, 120 and 122 begin communicating with the corresponding RANs to negotiate a bandwidth for the new communication mode. In this respect, SUs 118, 120, and 122 send RF BW Req messages 630, 634, and 635 to their corresponding RANs 112/110 and 116/110 to request additional RF bandwidth for the new communication mode. In response, the RANs 112/110 and 116/110 forwards the RF BW Req 636 and 632 to the call controller 102 by way of the carrier network 108 to determine whether the requested bandwidth is acceptable. The call controller 102 then sends a RF BW Resp messages 642 and 638 to the corresponding RANs 112/110 and 116/110 indicating whether the requested bandwidth is acceptable. In this example, the requested bandwidth is acceptable. The RANs 112/110 and 116/110, in turn, allocate RF resources and the RF parameters (e.g. bandwidth, carrier, time slot, Walsh code, etc.) via relay RF BW Update messages 644, 645, and 640 to the SUs 118, 120 and 122 indicating the acceptance of the bandwidth request.

Once, the RANs 112/110 and 116/110 send the RF BW Update messages 644, 645, and 640 to the SUs 118, 120 and 122, the RANs 112/110 and 116/110 send corresponding Session Updated messages 646 and 648 to the call controller 102 indicating that the communication mode is setup from the point of view of the corresponding RANs 112/110 and 116/110. In addition, the target SUs 120 and 122 send respective 200 OK messages 650 and 652 to the call controller 102 indicating that their respective RF resources are setup to handle the new communication mode. The call controller 102, in turn, forwards the 200 OK message 654 to the initiating SU 118 indicating that the target SUs 120 and 122 are now ready to communicate in the new communication mode. In response to receiving the 200 OK message 654, the initiating SU 118 sends an ACK message to the call controller 102 indicating it is now setup to communicate in the new communication mode. The call controller 102, in turn, forwards the ACK messages 658 and 660 to SUs 122 and 120. Once this occurs, the parties 118, 120, and 122 can communicate with each other in the new communication mode.

Figure 7:
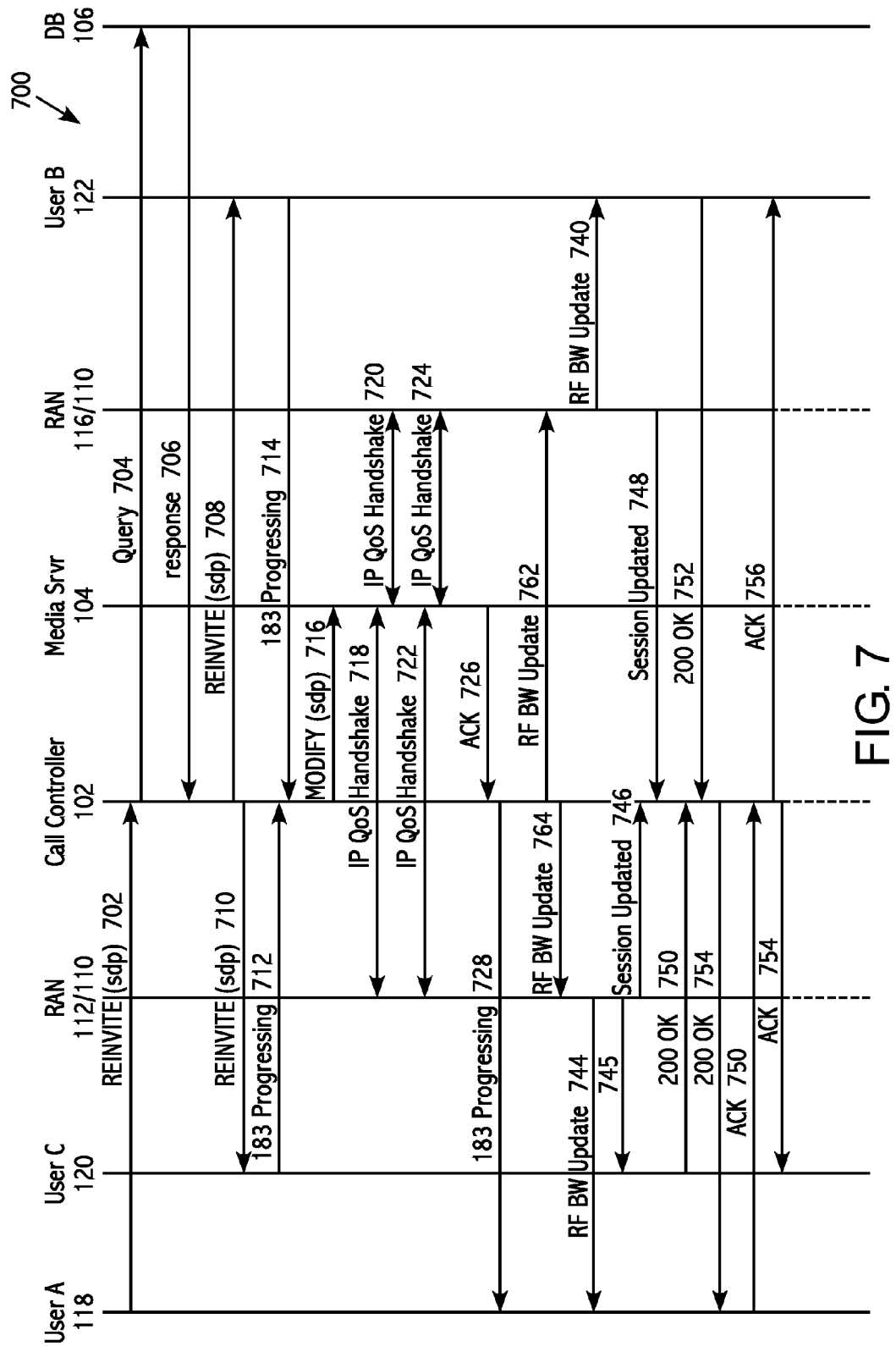
FIG. 7 illustrates a signal flow diagram of an exemplary method of seamlessly switching between communication modes in accordance with another embodiment of the invention.

FIG. 7 illustrates a signal flow diagram of an exemplary method 700 of seamlessly switching between communication modes in accordance with another embodiment of the invention. The method 700 is similar to method 600 except that the bandwidth negotiation is driven by the call controller 102 instead of the SUs. Accordingly, messages identical to those discussed in connection with method 600 are not discussed below since they have been discussed above. These common messages are identified with the same reference numbers except the most significant digit is a "7" instead of a "6" to facilitate their referencing.

After the switching request has been accepted by the call controller 102 sending the 183 Progressing message 728 to the initiating SU 118, the call controller 102 begins communicating with the corresponding RANs 112/110 and 116/110 to designate a bandwidth for the new communication mode. In this respect, the call controller 102 sends RF BW Update 764 and 762 to the RANs 112/110 and 116/110 instructing them on the new bandwidth requirements for the new communication mode. In response, the RANs 112/110 and 116/110 relay the RF BW Update messages 744, 745, and 740 to the SUs 118, 120 and 122 indicating an update of the bandwidth. The remaining messages of the method 700 are the same as that of method 600.

Figure 8:
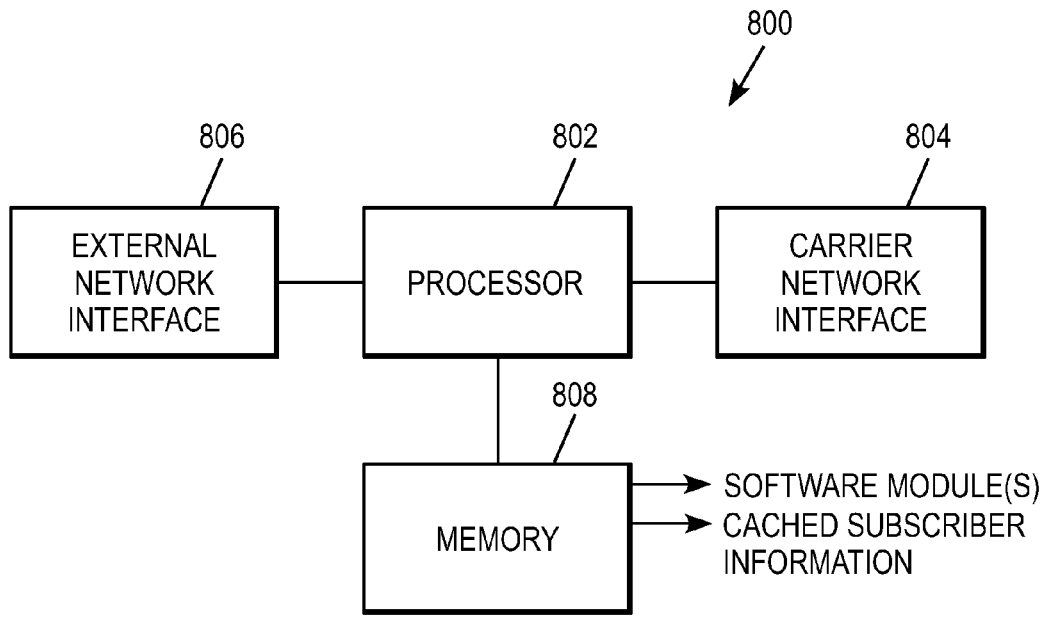
FIG. 8 illustrates a block diagram of an exemplary call controller in accordance with another embodiment of the invention.

FIG. 8 illustrates a block diagram of an exemplary call controller 800 in accordance with another embodiment of the invention. The call controller 800 is an exemplary detailed version of the call controller 102 of wireless communication system 100. The call controller 800 comprises a processor 802, a carrier network interface 804, an external network interface 806, and a memory 808. The processor 802 performs the various operations of the call controller 800 as discussed with reference to FIGS. 1-7. In particular, the processor 802 assists in setting up half-duplex and full-duplex modes as discussed with reference to FIGS. 3 and 5. In addition, the processor 802 assists in seamlessly switching communication modes between half-duplex and full-duplex as discussed with reference to FIGS. 2, 4, 6 and 7.

The carrier network interface 804 provides an interface to the carrier network 108 for receiving communication from and sending communication to the media server 104, database 106, base station controller 110, base stations 112 and 116, and other network devices. The external network interface 806 provides an interface to the external network 130 for receiving communication from and sending communication to end devices 132 and other external network devices. The memory 808, serving generally as a computer readable medium, stores one or more software modules for controlling the processor 802 in performing its operations, and may also store cached subscriber information as discussed above.

Figure 9A:
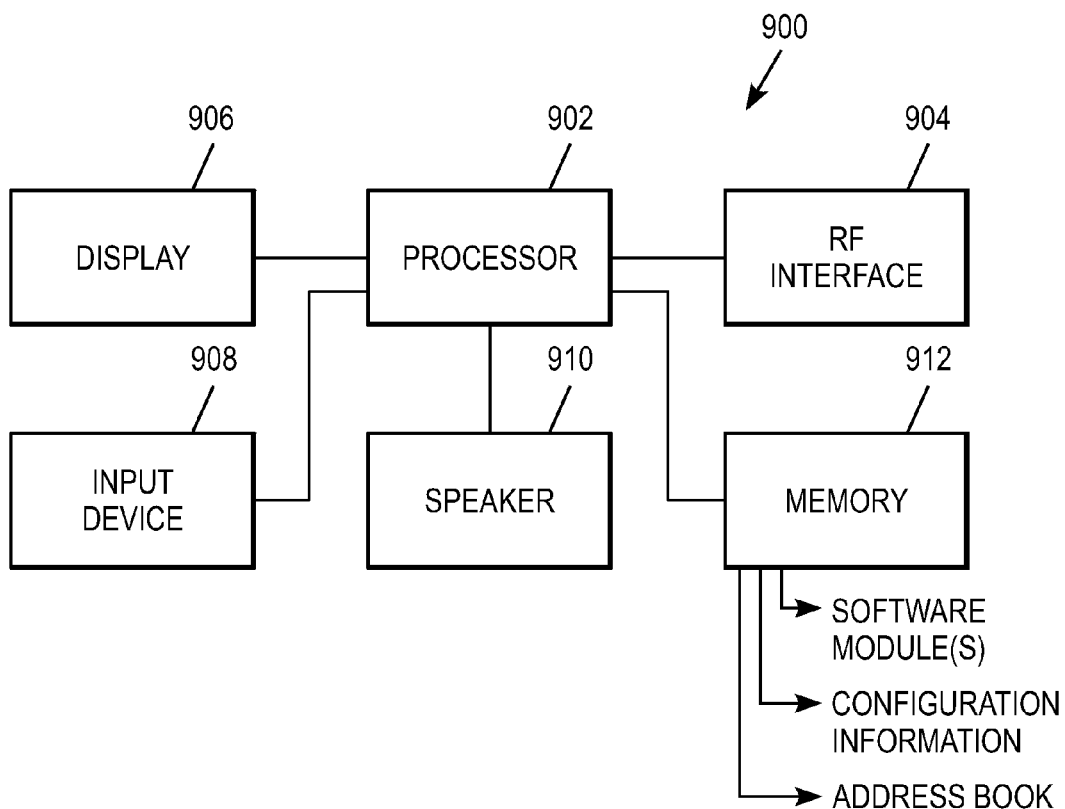
FIG. 9A illustrates a block diagram of an exemplary subscriber unit in accordance with another embodiment of the invention.

FIG. 9A illustrates a block diagram of an exemplary subscriber unit 900 in accordance with another embodiment of the invention. The subscriber unit 900 is an exemplary detailed version of the SUs 118, 120, and 122 of the wireless communication system 100. The subscriber unit 900 comprises a processor 902, an RF interface 904, a display 906, an input device 908, a speaker 910, and a memory 912. The subscriber unit 900 may also be an exemplary detailed version of the end device 132. In such a case, the RF interface 904 would be replaced with an external network interface.

The processor 902 performs the various operations of the subscriber unit 900 as discussed below with reference to FIGS. 9B-E. In particular, the processor 902 assists in requesting a communication session provided by the wireless communication system 100; assists in accepting a request for a communication session provided by the wireless communication session 100; assists in requesting a switch to another communication mode provided by the wireless communication system; and assists in accepting a request to switch an ongoing session to another communication mode provided by the wireless communication system 100.

The RF interface 904 provides an interface to the wireless medium for receiving communication from and sending communication to the wireless communication system 100 by way of base stations. Alternatively, the interface 904 could be an external network interface for receiving communication from and sending communication to the wireless communication system 100 by way of the external network 130. The display 906 provides a user with visual information. The input device 908 provides a user a manner to provide information to the subscriber unit 900 information. It shall be understood that the display 906 and input device 908 may be an integrated component, such as, for example, a touch-sensitive display screen. The speaker 910 provides a user with audio information. And, the memory 912, serving generally as a computer readable medium, stores one or more software modules for controlling the operations of the processor 902, configuration information, and address book entries. The following provides a discussion of various operations performed by the subscriber unit 900.

Figure 9B:
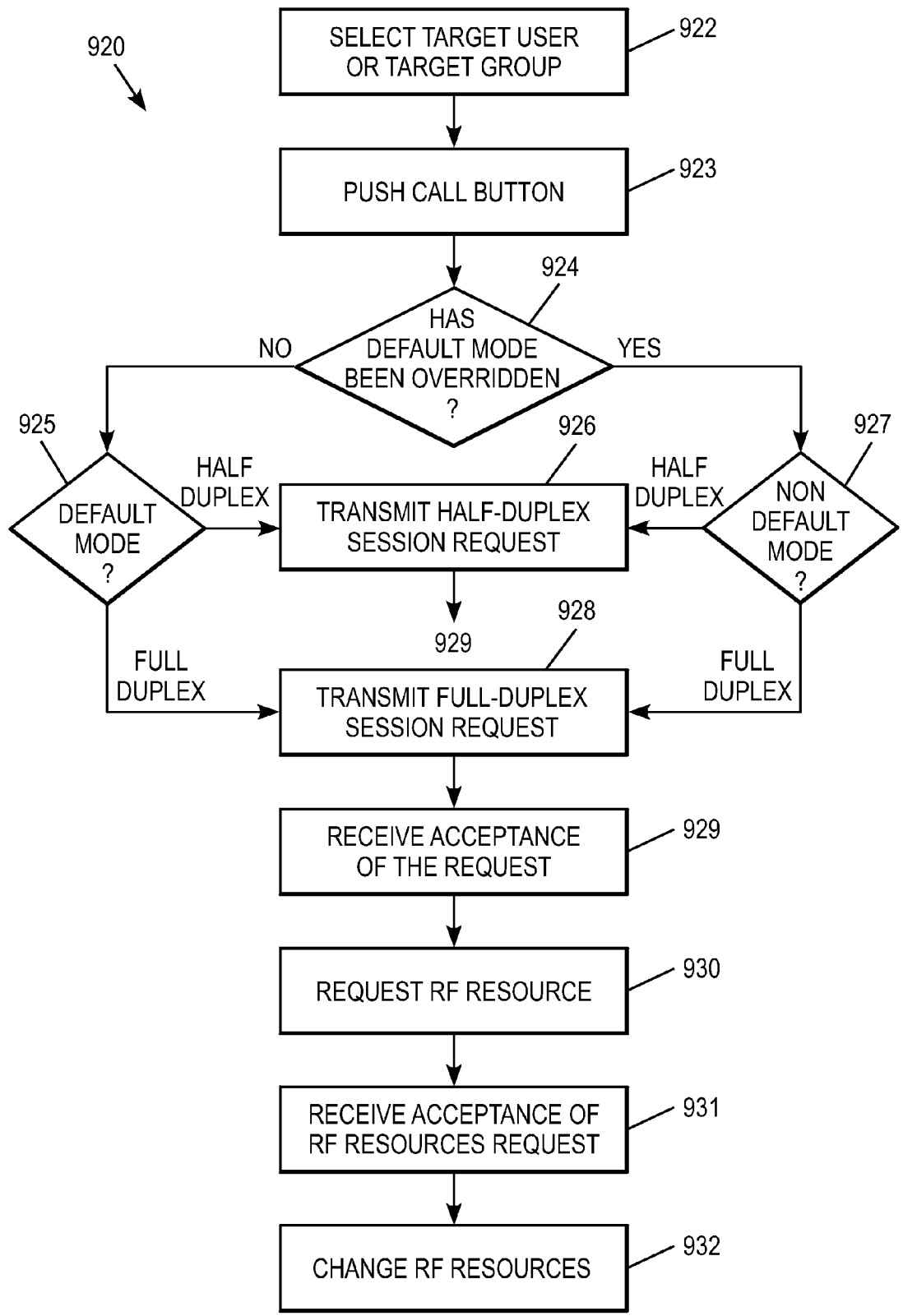
FIG. 9B illustrates a flow diagram of an exemplary method of requesting a communication session in accordance with another embodiment of the invention.

FIG. 9B illustrates a flow diagram of an exemplary method 920 of requesting a communication session in accordance with another embodiment of the invention. According to the method, a user selects a target user or target group using the input device 908 of the subscriber unit 900 (block 922). More specifically, the processor 902 causes the address book information stored in memory 912 to be shown on the display 906. The user may scroll down the display until the user finds and highlights the target user or target group. By activating the input device 908, such as a soft key or touch sensitive region on the display, the user selects the target user or target group. The input device 908, in turn, provides the selection information to the processor 902.

Once the user has selected the target user or target group, the user presses the call button or other configurable key (i.e. activates the input device 908) (block 923). The pressing of the call button causes the input device 908 to send an activation signal to the processor 902. In response to receiving the call button activation signal, the processor 902 determines whether the default communication mode has been overridden (block 924). Prior to commencing this request, the user may have set a default communication mode (e.g. full-duplex or half-duplex). Such information on the default communication mode is stored in the memory 912 as configuration information. The default mode may be overridden by the user, for example, prior to the user pressing the call button.

If the user has not overridden the default communication mode, the processor 902 access the configuration information stored in memory 912 to determine which communication mode is the default mode (block 925). If the processor 902 determines that the default communication mode is half-duplex, the processor 902 generates and transmits a half-duplex session request to the wireless communication system by way of the interface 904 (block 926). Otherwise, if the processor 902 determines that the default communication mode is full-duplex, the processor 902 generates and transmits a full-duplex session request to the wireless communication system by way of the interface 904 (block 928).

If, on the other hand, the processor 902 determines that the user has overridden the default communication mode as per block 924, the processor 902 determines which communication mode is not the default mode (block 927). If the processor determines that the non-default mode is half-duplex, the processor 902 generates and transmits a half-duplex session request to the wireless communication system by way of the interface 904 (block 926). Otherwise, if the processor 902 determines that the non-default communication mode is full-duplex, the processor 902 generates and transmits a full-duplex session request to the wireless communication system by way of the interface 904 (block 928).

Once the processor 902 has transmitted the request as per either block 926 or 928, the processor 902 receives an acceptance message from the wireless communication system by way of the interface 904 (block 929). In response to receiving this message, the processor 902 may send a request for RF resources to the base station by way of the interface 904 (block 930). Thereafter, the processor 902 may receive an acceptance message from the base station by way of the RF interface 904 indicating that the RF resource request has been accepted (block 931). Once the processor 902 receives this acceptance message, it changes the RF resource configuration in the RF interface 904 to be compliant with the selected mode of communication (block 932).

Figure 9C:
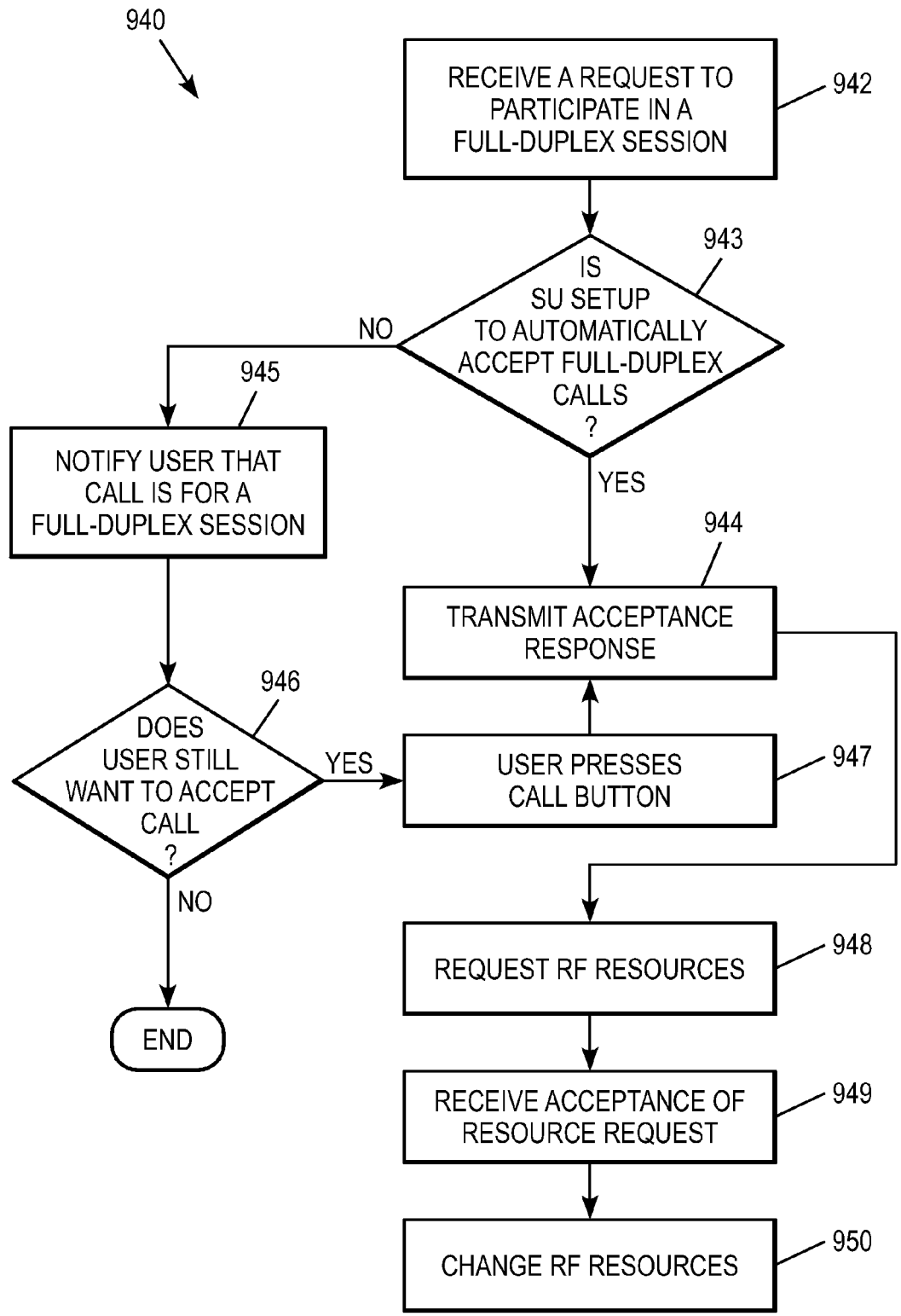
FIG. 9C illustrates a flow diagram of an exemplary method of accepting a request for a communication session in accordance with another embodiment of the invention.

FIG. 9C illustrates a flow diagram of an exemplary method 940 of accepting a request for a communication session in accordance with another embodiment of the invention. According to the method, the processor 902 receives a message by way of the interface 904 requesting the participation of the user in a full-duplex session (block 942). The processor 902 may notify the user of the request by providing a visual notification using the display 906 and/or an audio notification using the speaker 910. It shall be understood that the processor 902 may notify the user in other manners, such as by activating a vibrating device.

In response to receiving the request, the processor 902 determines whether the subscriber unit 900 is setup to automatically accept full-duplex calls (block 943). The processor 902 may determine this by accessing configuration information stored in the memory 912. If the processor 902 determines that the subscriber unit 900 is setup to automatically accept full-duplex calls, the processor 902 transmit an acceptance message to the wireless communication system by way of the interface 904 (block 944). Otherwise, if the subscriber unit 900 is not setup to automatically accept full-duplex calls, the processor 902 notifies the user that a request for a full-duplex session has been received (block 945). Again, the processor 902 may inform the user by providing a visual notification using the display 906, an audio notification using the speaker 910, and/or with other devices.

The processor 902 further queries the user using the display 906, speaker 910 and/or other device as to whether the user desires to accept the full-duplex call (block 946). If the user desires to accept the full-duplex call, the user pushes the call button or any other configurable key (i.e. activates the input device 908) (block 947). The pressing of the call button causes the input device 908 to send an activation signal to the processor 902. In response to receiving the call button activation signal, the processor 902 transmit an acceptance message to the wireless communication system by way of the interface 904 (block 944).

Once the processor 902 has transmitted the request as per either block 944, the processor 902 may send a request for RF resources to the base station by way of the RF interface 904 (block 948). Thereafter, the processor 902 may receive an acceptance message from the base station by way of the RF interface 904 indicating that the RF resource request has been accepted (block 949). Once the processor 902 receives this acceptance message, it changes the RF resource configuration in the RF interface 904 to be compliant with the full-duplex mode of communication (block 950).

Figure 9D:
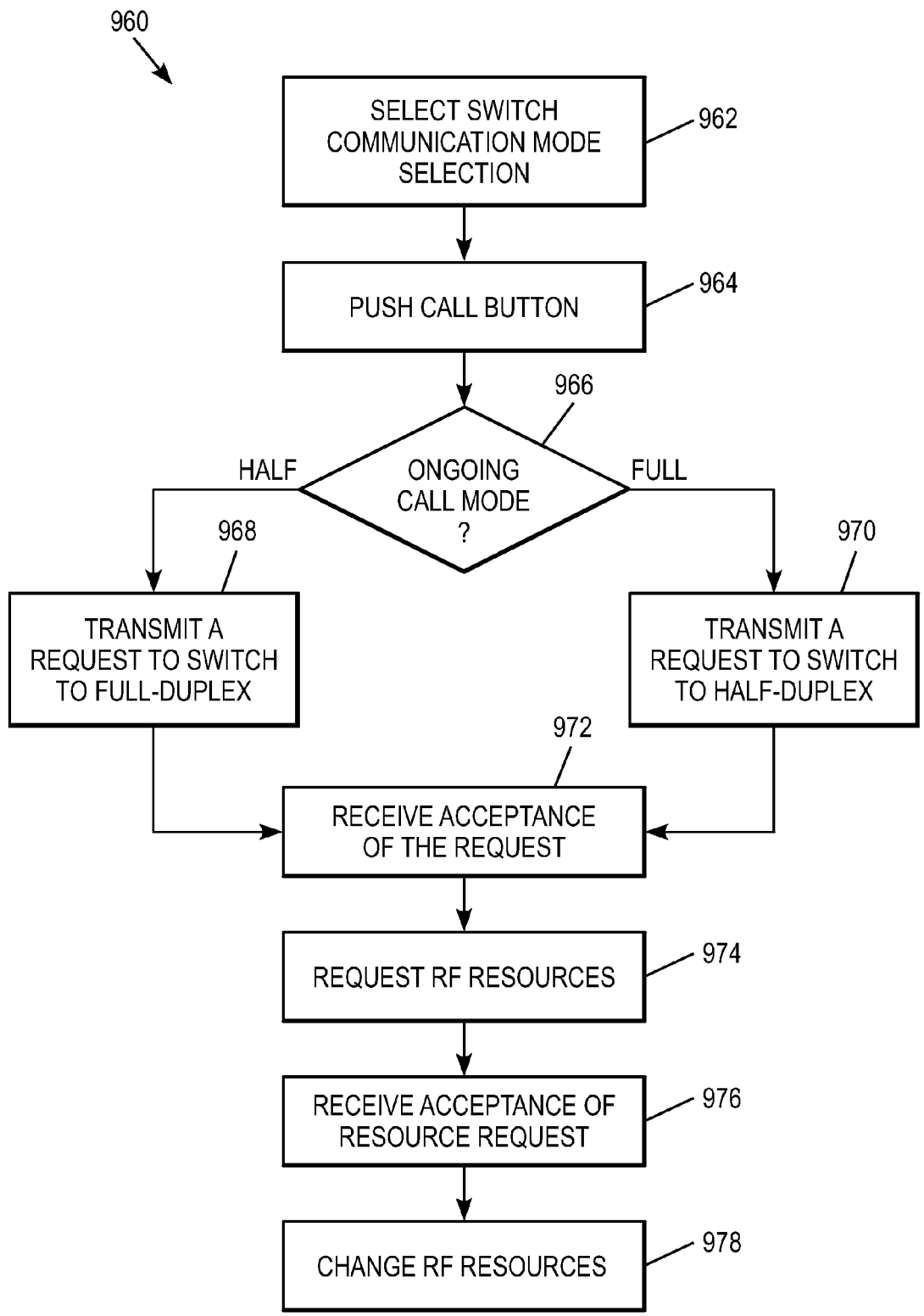
FIG. 9D illustrates a flow diagram of an exemplary method of requesting a switch to another communication mode in accordance with another embodiment of the invention.

FIG. 9D illustrates a flow diagram of an exemplary method 960 of requesting a switch to another communication mode of an ongoing communication session in accordance with another embodiment of the invention. According to the method 960, a user, currently participating in an ongoing communication mode session, activates a communication mode switch selection using the input device 908 (block 962). For example, the processor 902 may cause a switch mode selection to be shown on the display 906. The user may highlight the selection using a soft key or touch sensitive region on the display 906. The input device 908, in turn, provides the selection information to the processor 902.

Once the user has activated the switch communication mode selection, the user presses the call button or some other configurable key (i.e. activates the input device 908) (block 964). The pressing of the call button causes the input device 908 to send an activation signal to the processor 902. In response to receiving the call button activation signal, the processor 902 determines the communication mode of the ongoing session (block 966). If the processor 902 determines that the ongoing session is a full-duplex session, the processor 902 generates and transmits a request to switch to half-duplex to the wireless communication system by way of the interface 904 (block 970). Otherwise, if the processor 902 determines that the ongoing session is a half-duplex session, the processor 902 generates and transmits a request to switch to full-duplex to the wireless communication system by way of the interface 904 (block 968).

Once the processor 902 has transmitted the request as per either block 968 or 970, the processor 902 receives an acceptance message from the wireless communication system by way of the interface 904 (block 972). In response to receiving this message, the processor 902 may send a request for RF resources to the base station by way of the RF interface 904 (block 974). Thereafter, the processor 902 may receive an acceptance message from the base station by way of the RF interface 904 indicating that the RF resource request has been accepted (block 976). Once the processor 902 receives this acceptance message, it changes the RF resource configuration in the RF interface 904 to be compliant with the selected mode of communication (block 978).

Figure 9E:
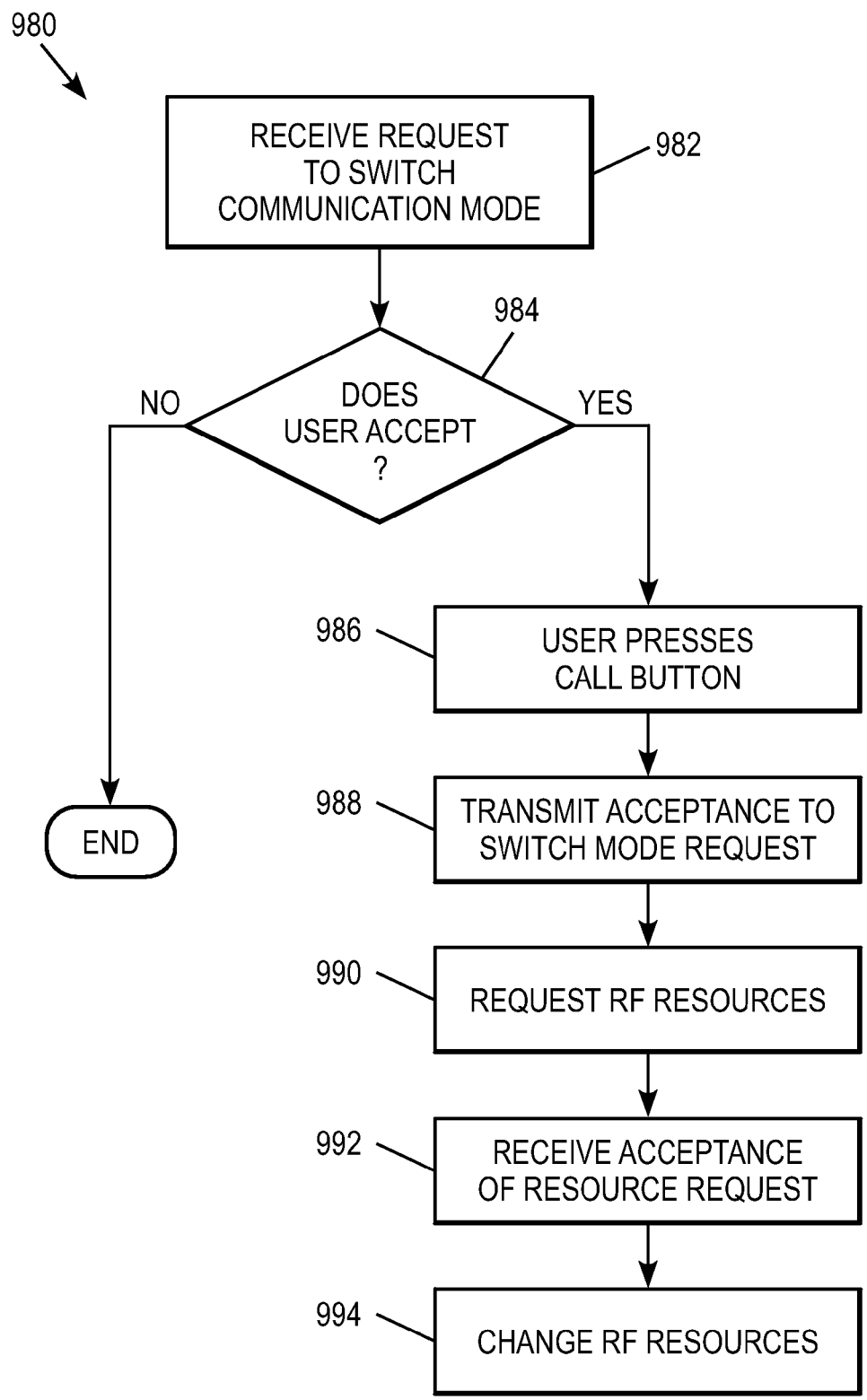
FIG. 9E illustrates a flow diagram of an exemplary method of accepting a request for a communication mode switch in accordance with another embodiment of the invention.

FIG. 9E illustrates a flow diagram of an exemplary method 980 of accepting a request for a communication mode switch in accordance with another embodiment of the invention. According to the method 980, the processor 902 receives a message by way of the interface 904 requesting a switch of the communication mode of the ongoing call (block 982). The processor 902 may notify the user of the request by providing a visual notification using the display 906, an audio notification using the speaker 910, and/or using other devices. The subscriber unit 900 may be setup to automatically accept the switching request. In such case, the method 900 proceeds from block 982 to block 988.

Otherwise, the processor 902 queries the user using the display 906, speaker 910 and/or other device as to whether the user desires to accept the switch mode request (block 984). If the user does not decide to accept the switch mode request, the processor 902 ends the method 900 after a predetermined time period. If, on the other hand, the user desires to accept the switch mode request, the user pushes the call button or any other configurable key (i.e. activates the input device 908) (block 986). The pressing of the call button causes the input device 908 to send an activation signal to the processor 902. In response to receiving the call button activation signal, the processor 902 transmit an acceptance message to the wireless communication system by way of the interface 904 (block 988).

Once the processor 902 has transmitted the request, the processor 902 may send a request for RF resources to the base station by way of the RF interface 904 (block 990). Thereafter, the processor 902 may receive an acceptance message from the base station by way of the RF interface 904 indicating that the RF resource request has been accepted (block 992). Once the processor 902 receives this acceptance message, it changes the RF resource configuration in the RF interface 904 to be compliant with the new mode of communication (block 994).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

It is claimed:

1. A method comprising:
    transmitting a first request to a wireless communication system requesting a communication session in a first communication mode with one or more users;
    communicating with the one or more users in the communication session and in the first communication mode;
    while in the communication session, transmitting a second request to the wireless communication system to switch the first communication mode to a different second communication mode, wherein the first and second communication modes are full-duplex or half-duplex communication modes; and
    communicating with the one or more users in the communication session and in the second communication mode when the one or more users are eligible to switch from the first communication mode to the second communication mode and when a configurable number of the one or more users in the communication session accept the request to switch from the first communication mode to the second communication mode,
    wherein a communication unit that transmitted the second request is informed that the one or more users are not eligible to switch from the first communication mode to the second communication mode when at least one of the one or more users is not eligible to switch from the first communication mode to the second communication mode, wherein eligibility to switch from the first communication mode to the second communication mode is determined based on information in a database.

2. The method of claim 1, wherein the first communication mode comprises a half-duplex communication mode.

3. The method of claim 2, wherein the second communication mode comprises a full-duplex communication mode.

4. The method of claim 1, wherein the first communication mode comprises a full-duplex communication mode.

5. The method of claim 4, wherein the second communication mode comprises a half-duplex communication mode.

6. A subscriber unit comprising;
    an interface; and
    a processor to:
        transmit a first request to a wireless communication system by way of the interface to request a communication session in a first communication mode with one or more users;
        communicate with the one or more users by way of the interface in the communication session and in the first communication mode;
        transmit, while in the communication session, a second request to the wireless communication system by way of the interface to switch the first communication mode to a different second communication mode, wherein the first and second communication modes are full-duplex or half-duplex communication modes; and
    communicate with the one or more users by way of the interface in the communication session and in the second communication mode when the one or more users are eligible to switch from the first communication mode to the second communication mode and when a configurable number of the one or more users in the communication session accept the request to switch from the first communication mode to the second communication mode
        wherein a communication unit that transmitted the second request is informed that the one or more users are not eligible to switch from the first communication mode to the second communication mode when at least one of the one or more users is not eligible to switch from the first communication mode to the second communication mode, wherein eligibility to switch from the first communication mode to the second communication mode is determined based on information in a database.

7. The subscriber unit of claim 6, wherein the first communication mode comprises a half-duplex communication mode.

8. The subscriber unit of claim 7, wherein the second communication mode comprises a full-duplex communication mode.

9. The subscriber unit of claim 6, wherein the first communication mode comprises a full-duplex communication mode.

10. The subscriber unit of claim 9, wherein the second communication mode comprises a half-duplex communication mode.

11. The subscriber unit of claim 6, wherein the interface comprises a radio frequency (RF) interface.

12. The subscriber unit of claim 6, wherein the interface comprises an external network interface.

13. The subscriber unit of claim 6, wherein said processor is adapted to change RF resources provided by said interface to handle said second communication mode.

14. A non-transitory computer readable medium comprising one or more software modules to control a processor to:
   transmit a first request to a wireless communication system to request a communication session in a first communication mode with one or more users;
   communicate with the one or more users in the communication session and in the first communication mode;
   transmit, while in the communication session, a second request to the wireless communication system by way of an interface to switch the first communication mode to a different second communication mode, wherein the first and second communication modes are full-duplex or half-duplex communication modes; and
   communicating with the one or more users by way of the interface in the communication session and in the second communication mode when the one or more users are eligible to switch from the first communication mode to the second communication mode and when a configurable number of the one or more users in the communication session accept the request to switch from the first communication mode to the second communication mode
   wherein a communication unit that transmitted the second request is informed that the one or more users are not eligible to switch from the first communication mode to the second communication mode when at least one of the one or more users is not eligible to switch from the first communication mode to the second communication mode, wherein eligibility to switch from the first communication mode to the second communication mode is determined based on information in a database.

15. The non-transitory computer readable medium of claim 14, wherein the first communication mode comprises a half-duplex communication mode.

16. The non-transitory computer readable medium of claim 15, wherein the second communication mode comprises a full-duplex communication mode.

17. The non-transitory computer readable medium of claim 14, wherein the first communication mode comprises a full-duplex communication mode.

18. The non-transitory computer readable medium of claim 17, wherein the second communication mode comprises a half-duplex communication mode.

19. The non-transitory computer readable medium of claim 14, wherein said one or more software modules are adapted to control said processor to change RF resources to handle said second communication mode.

20. A method comprising:
   receiving a first request from a wireless communication system requesting a communication session in a first communication mode with one or more users;
   transmitting a first response to said first request to said wireless communication system, wherein said first response indicates an acceptance of said first request;
   communicating with the one or more users in the communication session and in the first communication mode;
   while in the communication session, receiving a second request from the wireless communication system to switch the first communication mode to a different second communication mode when the one or more users are eligible to switch from the first communication mode to the second communication mode, wherein eligibility to switch from the first communication mode to the second communication mode is determined based on information in a database;
   transmitting a second response to said second request to said wireless communication system, wherein said second response indicates an acceptance of said second request; and
   communicating with the one or more users in the communication session and in the second communication mode when a configurable number of the one or more users accept the second request.

21. The method of claim 20, wherein the first communication mode comprises a half-duplex communication mode.

22. The method of claim 21, wherein the second communication mode comprises a full-duplex communication mode.

23. The method of claim 20, wherein the first communication mode comprises a full-duplex communication mode.

24. The method of claim 23, wherein the second communication mode comprises a half-duplex communication mode.

25. The method of claim 20, further comprising changing RF resources to handle said second communication mode.

26. The method of claim 20, wherein transmitting said second response is performed automatically after receiving said second request.

27. A subscriber unit comprising;
   an interface; and
   a processor to:
      receive a first request from a wireless communication system by way of said interface requesting a communication session in a first communication mode with one or more users;
      transmit a first response to said first request to said wireless communication system by way of said interface, wherein said first response indicates an acceptance of said first request;
      communicate with the one or more users in the communication session and in the first communication mode;
      while in the communication session, receive a second request from the wireless communication system by way of said interface to switch the first communication mode to a different second communication mode when the one or more users are eligible to switch from the first communication mode to the second communication mode, wherein eligibility to switch from the first communication mode to the second communication mode is determined based on information in a database;
      transmit a second response to said second request to said wireless communication system by way of said interface, wherein said second response indicates an acceptance of said second request; and
      communicate with the one or more users in the communication session and in the second communication mode when a configurable number of the one or more users accept the second request.

28. The subscriber unit of claim 27, wherein the first communication mode comprises a half-duplex communication mode.

29. The subscriber unit of claim 28, wherein the second communication mode comprises a full-duplex communication mode.

30. The subscriber unit of claim 27, wherein the first communication mode comprises a full-duplex communication mode.

31. The subscriber unit of claim 30, wherein the second communication mode comprises a half-duplex communication mode.

32. The subscriber unit of claim 27, wherein the interface comprises a radio frequency (RF) interface.

33. The subscriber unit of claim 27, wherein the interface comprises an external network interface.

34. The subscriber unit of claim 27, wherein said processor is adapted to change RF resources provided by said interface to handle said second communication mode.

35. The subscriber unit of claim 27, wherein said processor is adapted to automatically transmit said second response in response to receiving said second request.

36. A non-transitory computer readable medium comprising one or more software modules to control a processor to:
receive a first request from a wireless communication system interface requesting a communication session in a first communication mode with one or more users;
transmit a first response to said first request to said wireless communication system, wherein said first response indicates an acceptance of said first request;
communicate with the one or more users in the communication session and in the first communication mode;
while in the communication session, receive a second request from the wireless communication system to switch the first communication mode to a different second communication mode when the one or more users are eligible to switch from the first communication mode to the second communication mode, wherein eligibility to switch from the first communication mode to the second communication mode is determined based on information in a database;
transmit a second response to said second request to said wireless communication system, wherein said second response indicates an acceptance of said second request; and
communicate with the one or more users in the communication session and in the second communication mode when a configurable number of the one or more users accept the second request.

37. The non-transitory computer readable medium of claim 36, wherein the first communication mode comprises a half-duplex communication mode.

38. The non-transitory computer readable medium of claim 37, wherein the second communication mode comprises a full-duplex communication mode.

39. The non-transitory computer readable medium of claim 36, wherein the first communication mode comprises a full-duplex communication mode.

40. The non-transitory computer readable medium of claim 39, wherein the second communication mode comprises a half-duplex communication mode.

41. The non-transitory computer readable medium of claim 36, wherein said one or more software modules are adapted to control said processor to change RF resources to handle said second communication mode.

42. The non-transitory computer readable medium of claim 36, wherein said one or more software modules are adapted to control said processor to automatically transmit said second response in response to receiving said second request.

* * * * *